(12) United States Patent
Zhang et al.

(10) Patent No.: US 9,160,952 B2
(45) Date of Patent: Oct. 13, 2015

(54) CMOS CHARGE PUMP CIRCUIT

(71) Applicants: Ning Zhang, Shanghai (CN); Benyan Wang, Shanghai (CN)

(72) Inventors: Ning Zhang, Shanghai (CN); Benyan Wang, Shanghai (CN)

(73) Assignee: Shanghai Huali Microelectronics Corporation, Shanghai (CN)

( * ) Notice: Subject to any disclaimer, the term of this patent is extended or adjusted under 35 U.S.C. 154(b) by 133 days.

(21) Appl. No.: 14/091,337

(22) Filed: Nov. 26, 2013

(65) Prior Publication Data
US 2014/0333811 A1    Nov. 13, 2014

(30) Foreign Application Priority Data
May 7, 2013    (CN) .......................... 2013 1 0165971

(51) Int. Cl.
*H04N 5/335* (2011.01)
*H04N 9/04* (2006.01)
*H04N 5/369* (2011.01)
*H04N 5/3745* (2011.01)
*H04N 5/357* (2011.01)

(52) U.S. Cl.
CPC ........... *H04N 5/3698* (2013.01); *H04N 5/3577* (2013.01); *H04N 5/3745* (2013.01)

(58) Field of Classification Search
None
See application file for complete search history.

(56) References Cited

U.S. PATENT DOCUMENTS

| 2007/0252619 A1* | 11/2007 | Bitting ........................... 326/87 |
| 2011/0140676 A1* | 6/2011 | Lin ............................... 323/271 |
| 2011/0254615 A1* | 10/2011 | Raghunathan et al. ....... 327/536 |

FOREIGN PATENT DOCUMENTS

| CN | 101478644 A | 7/2009 |
| CN | 103259536 A | 8/2013 |

* cited by examiner

*Primary Examiner* — Aung S Moe
*Assistant Examiner* — Euel Cowan
(74) *Attorney, Agent, or Firm* — Michael D. Eisenberg

(57) ABSTRACT

The present invention discloses a device of CMOS image sensor, exactly, relates to a kind of CMOS charge pump circuit. The invention compromises: two current mirrors and two operational amplifiers are added into the CMOS charge pump circuit. The feed-through current is suppressed when signal switches in the said circuit. It solved the problem of the big voltage jump of the output voltage when the logic signal switches. It guarantees the stabilities of the circuit and the output voltage.

16 Claims, 2 Drawing Sheets

CMOS CHARGE PUMP CIRCUIT

CROSS-REFERENCES TO RELATED APPLICATIONS

The present application claims priority under the Paris Convention to Chinese application number CN 201310165971.7, filed on May 7, 2013, the disclosure of which is herewith incorporated by reference in its entirety.

TECHNICAL FIELD

The invention relates to CMOS (Complementary Metal Oxide Semiconductor) image sensor, more specifically, relates to a CMOS charge pump circuit.

BACKGROUND OF THE INVENTION

With the development of the integrated circuit technology, the Charge Pump Phase-locked Loop is widely used in the wireless telecommunication, the frequency synthesizer and the clock recovery Circuit because its features of the low power consumption, the high speed, the low jitter and the low cost, etc.

CMOS (Complementary Metal Oxide Semiconductor) image sensor is a kind of amplifying device for voltage controlling. It is the basic component of CMOS digital integrated circuit. It is mainly used in the semiconductor device transforming the optical image into electrical signals. Usually, the CMOS image sensor need to use the technology of charge pump in order to generate a voltage higher than the source voltage on silicon wafer. The generated high voltage is generally used for driving the pixel units of the CMOS image sensor, for example the reset end and shift end in the pixel unit.

FIG. 1 is the CMOS charge pump circuit layout of the prior art. As shown in FIG. 1, when the UP signal switches, the output voltage Vout will be pulled to the Earth End GND through the switches M1 and M2. A relatively big voltage jump is generated. Likewise, when the DN signal switches, the output voltage Vout will be pulled to the source voltage VDD through the switches M3 and M4. And a relatively big voltage jump is generated, which affect the stability of the circuit.

Chinese Patent (CN101478644A) discloses a charge pump control circuit and method of the CMOS image sensor. The said charge pump control circuit of the CMOS image sensor compromises: the high voltage limit comparing unit used for comparing the output voltage of the charge pump to the high voltage limit; the horizontal synchronizing signal providing unit used for providing synchronizing signal based on horizontal readout time. The horizontal synchronizing signal reaches the high level earlier than the horizontal selection signal. And the horizontal synchronizing signal changes into low level on the rising edge. A charge pump control unit is further included. The charge pump is switched on when the horizontal synchronizing signal is high level and output voltage of the charge pump is lower than the high voltage limit. The chare pump is switched off when the output voltage of the charge pump is higher than the high voltage limit. The CMOS image sensor charge pump control circuit and method thereof can avoid reading out noise.

The invention raises the output voltage of the charge pump to the high voltage limit. The output voltage of the each line of the pixel unit of the CMOS image sensor in the stage of horizontal readout is same. It avoided the noise due the different output voltage of each line of the pixel unit of the CMOS image sensor in the stage of horizontal readout. However, the invention did not solve the problem of voltage jump due to the logic signal switching in the CMOS charge pump circuit.

Chinese Patent (CN 103259536A) discloses a charge pump circuit based on the standard CMOS process, which is applied to the low current mismatch and the low current change in the charge pump phase-locked loop circuit. The charge pump circuit consists of the current bias circuit, the reference current circuit, the output current circuit and the amplifier.

In this invention, the negative feedback loop is formed by the amplifier. The negative feedback loop is used to reduce the mismatch between the charge current caused by change of voltage of the output and the discharge current. The current with a positive output voltage coefficient is added with the current with a negative output voltage coefficient in order to reduce the overall changes of the charge current and the discharge current during the voltage change in the output end. However, this patent did not solve the problem of the big voltage jump when the signal switches. And the stability of the circuit is affected.

BRIEF SUMMARY OF EMBODIMENTS OF THE INVENTION

Due to the defects of the traditional art, the device of the invention adds two current mirror and two operational amplifiers in the CMOS charge pump circuit in order to solve problem of the big voltage jump of the output voltage when the logic signal switches and further to guarantee the stabilities of the circuit and the output voltage. It comprises:

A CMOS charge pump circuit, wherein the CMOS charge pump circuit comprises:

A reference current, an earth end and an eleventh transistor set between the reference current and the earth end;

A first current steering switch and the second current steering switch, wherein the first current steering switch is coupled with a third transistor, the second current steering switch is coupled with an eighth transistor, and an output voltage is provided on the connected node between the first current steering switch and the second current steering switch;

A mirror current generator, wherein the mirror current generator comprises the multiple transistors to form the two mirror current of the eleventh transistor, comprising the first mirror current IX and the second mirror current IY; the first mirror current IX is supplied to the first current steering switch; the second mirror current IY is supplied to the second current steering switch;

The said mirror current generator is set between the supply voltage of CMOS charge pump circuit and the earth end thereof.

According to the above device, wherein the mirror current generator compromises:

The interconnected a tenth transistor and a fifth transistor, where the said source electrode of the tenth transistor is connected to the drain electrode of the fifth transistor. The tenth transistor is used to generate the mirror current of the eleventh transistor, and it makes that the current passes through the fifth transistor is same as that passes through the tenth transistor;

The mirror current generator further comprises a fourth transistor used for generating the mirror current passing through the fifth transistor. The second mirror current IY passing through the fourth transistor is supplied to the second steering switch.

According to the above device, wherein the transistor of the mirror current generator further comprises a ninth transistor used for generating the current passing through the tenth transistor. The first mirror current IX passing through the ninth transistor is supplied to the first current steering switch. The current passing through the ninth transistor is the mirror current IX in the eleventh transistor.

According to the above device, wherein the third transistor is used for generating the mirror current of the fifth transistor and is used as the input current of the second current steering switch;

The second current steering switch comprises a seventh transistor and a sixth transistor. The seventh transistor and the sixth transistor are controlled respectively by logic signal DNB and logic signal DN. The logic signal DNB and the logic signal DN are used for selecting the flowing direction of the input current of the second current steering switch.

According to the above device, wherein the logic signal DNB and the logic signal DN are set reversely.

According to the above device, wherein the eighth transistor is used for generating the mirror current of the tenth transistor and is used as the input current of the first current steering switch. The first transistor and the second transistor which are comprised in the first current steering switch are controlled respectively by the logic signal UP and the logic signal UPB. The logic signal UP and the logic signal UPB are used for selecting the flowing direction of the input current of the first current steering switch.

According to the above device, wherein the logic signal UP and the logic signal UPB are set reversely.

According to the above device, wherein the current passing through the eighth transistor is the mirror current regarding to the tenth transistor.

According to the above device, wherein the first current steering switch comprises a transistor and a second transistor whose sources are interconnected. The sources of the first transistor and the second transistor are connected to one end of the third transistor; wherein the first mirror current IX is inputted into the drain electrode of the first transistor, and the output voltage thereof is connected to the drain electrode of the second transistor.

According to the above device, wherein the second current steering switch comprises a sixth transistor and a seventh transistor whose drain electrodes are interconnected. The drain electrodes of the sixth transistor and the seventh transistor connect to one end of the eighth transistor; wherein the second mirror current IY is inputted into the source electrode of the seventh transistor, and the output voltage thereof is connected to the source electrode of the sixth transistor.

According to the above device, wherein the first and the second current steering switches comprise an operational amplifier AMP1 and AMP2 respectively;

wherein, the output end of the said operational amplifier AMP1 of the first current steering switch is connected to the ninth transistor of the mirror current generator and to the logic signal UP of the first current steering switch, and the negative input end of the operational amplifier AMP1 is connected connect to the drain electrode of the first transistor;

wherein, the output end of the operational amplifier AMP2 of the second current steering switch is connected to the fourth transistor of the mirror current generator and to the logic signal DNB of the second current steering switch, and the negative input end of the operational amplifier AMP2 is connected to the drain electrode of the seventh transistor;

wherein, an output voltage is provided on the connected node of the positive input ends of the operational amplifiers of the first current steering switch and of the second current steering switch;

wherein, the operational amplifier is used to suppress the feed-through current generated by the first mirror current IX passing through the first transistor and the second transistor of the first current steering switch, or by the second mirror current IY passing through the sixth transistor and the seventh transistor of the second current steering switch. It ensure that the output voltage is in accordance with the first mirror current IX or the second mirror current IY.

According to the above device, wherein the size of the third transistor equals to the fourth transistor of the mirror current generator.

According to the above device, wherein the size of the eighth transistor equals to the ninth transistor of the mirror current generator.

According to the above device, wherein the ratio between the gate length of the mirror current generator, the ninth transistor and the gate width of the mirror current generator, tenth transistor equals to the ratio between the gate length of the mirror current generator, the fourth transistor and the gate width of the mirror current generator, the fifth transistor.

According to the above device, wherein the fifth transistor and the fourth transistor of the mirror current generator, the first transistor and the second transistor of the first current steering switches and the third transistor coupled to the first current steering switch are entirely PMOS.

According to the above device, wherein the tenth transistor and the ninth transistor of the mirror current generator, the sixth transistor and the seventh transistor of the second current steering switches and the eighth transistor coupled to the second current steering switch are entirely NMOS.

The device of the invention adds two current mirror and two operational amplifiers in the CMOS charge pump circuit. When the logic signal switches in the CMOS charge pump circuit, the output voltage thereof is in accordance with the mirror current IX or IY generates by the mirror mirror current generator. It solved problem of the big voltage jump of the output voltage when the logic signal switches and the output voltage is pulled to the source voltage or to the earth end. And it guarantees the stability of the circuit.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiment of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The present invention, in accordance with one or more various embodiments, is described in detail with reference to the following figures. The drawings are provided for purposes of illustration only and to merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE OF THE INVENTION

From time-to-time, the present invention is described herein in terms of example environments. Description in terms of these environments is provided to allow the various features and of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention will be further illustrated in combination with the following figures and embodiments, but it should not be deemed as limitation of the present invention.

Figure 1:
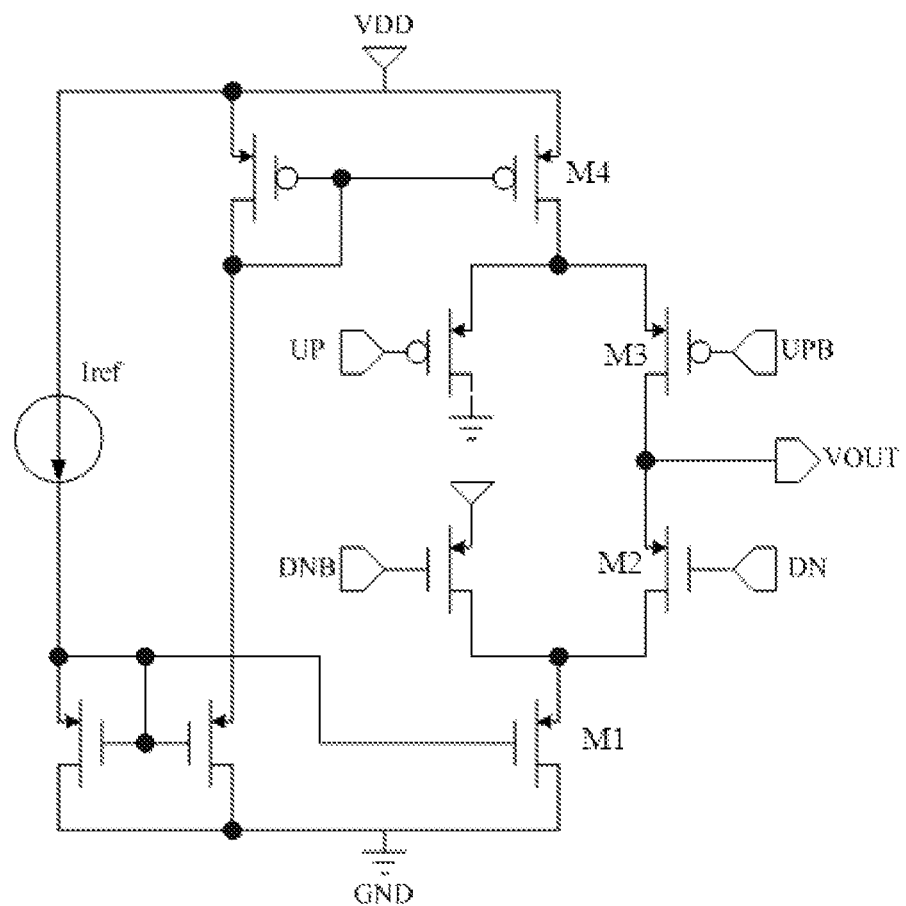
FIG. 1 is the circuit diagram of the CMOS charge pump circuit layout in traditional technology.
Figure 2:
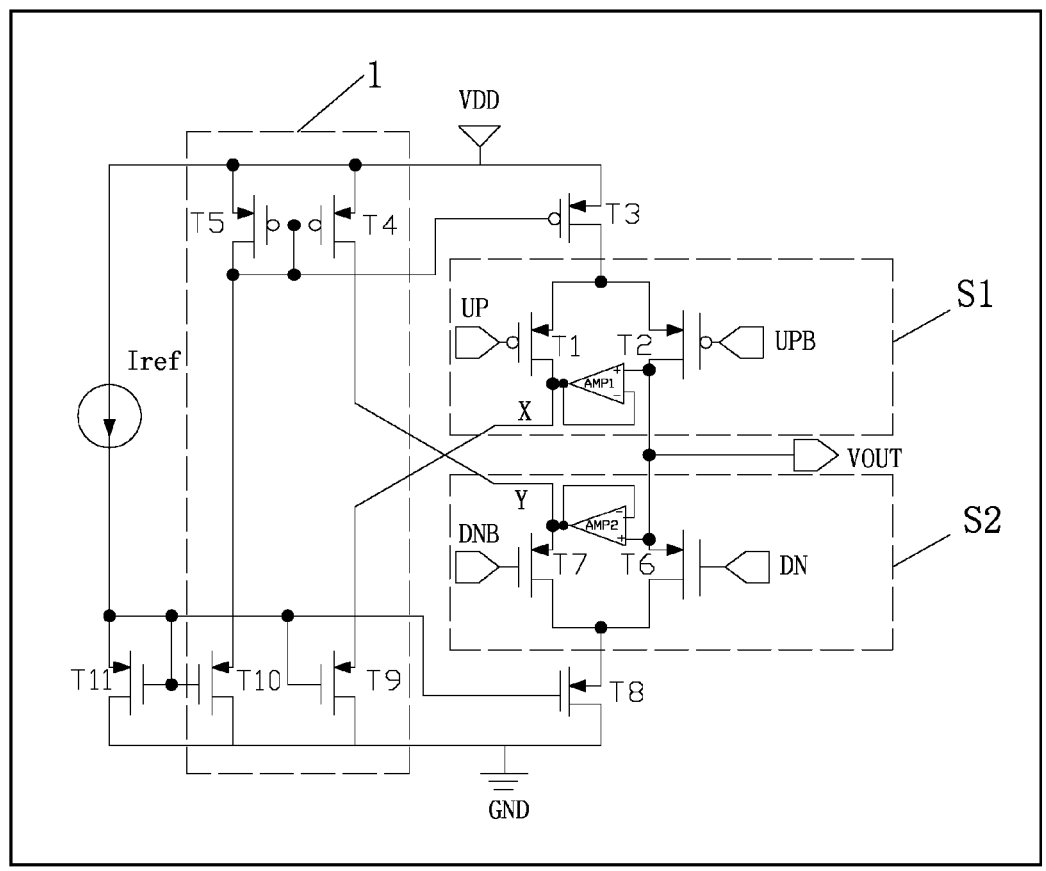
FIG. 2 is the circuit diagram of the CMOS charge pump circuit in the invention.

FIG. 2 is the circuit diagram of the CMOS charge pump circuit in the invention. As shown in figure, the CMOS charge pump circuit comprises the Mirror Mirror current Generator 1, the First Current Steering Switch S1, the Second Current Steering Switch S2. An Output Voltage Vout is provided on the connected node between the First Current Steering Switch S1 and the Second Current Steering Switch S2.

It also includes, a Reference Current Source Iref, a transistor T11 and the Mirror current Generator 1 which are sets between the Main Input VDD and the Earth End GND, a transistor T11 set between the Reference Current Source Iref and the Earth End GND.

The Mirror current Generator 1 comprises multiple transistors: the fourth transistor T4, the fifth transistor T5, the ninth transistor T9, the tenth transistor T10. The source electrode of the tenth transistor T10 is connected to the drain electrode of the fifth transistor T5. The tenth transistor T10 generates the mirror current of the eleventh transistor T11, and the tenth transistor T10 ensures the current passing through the fifth transistor T5 and the tenth transistor T10 to be the same as to mirror current. The ninth transistor is used to generate the first mirror current IX, and to provide the first mirror current IX to the First Current Steering Switch S1;

The fourth transistor of the Mirror current Generator 1 is to generate the second mirror current IY passing through the fifth transistor T5, and provide second mirror current IY to the Second Current Steering Switch S2. Wherein the ratio between the length and the width of the gate of the ninth transistor T9 and the tenth transistor T10 of the Mirror Mirror current Generator 1 equals to the ratio between the length and the width of the gate of the fourth transistor T4 and fifth transistor T5.

The First Current Steering Switch S1 is coupled with the third transistor T3. The third transistor T3 is used for generating the mirror current of the fifth transistor T5 which is used as the input current of the Second Current Steering Switch S2.

The First Current Steering Switch S1 comprises the first transistor T1 and the second transistor T2 with the sources of the two interconnected transistors. The source of the first transistor T1 and the second transistor T2 is connected to one end of the third transistor T3. The first mirror current IX generating by the ninth transistor T9 is inputted to the drain electrode of the first transistor T1. The output voltage Vout of the first transistor T1 is connected to the drain electrode of the second transistor T2.

The first transistor T1 is controlled by logic signal UP. The second transistor T2 is controlled by logic signal UPB. The logic signal UP and the logic signal UPB are used for selecting the flowing direction of the input current of the First Current Steering Switch S1, wherein the logic signal UP and the logic signal UPB are set reversely.

The Second Current Steering Switch S2 is coupled with the eighth transistor T8. The eighth transistor T8 is used for generating the mirror current of the tenth transistor T10 which is used as the input current of the First Current Steering Switch S1.

The Second Current Steering Switch S2 comprises the sixth transistor T6 and the seventh transistor T7 with the interconnected drain electrodes of the two transistors. The drain electrode of the sixth transistor T6 and the drain electrode of the seventh transistor T7 are connected respectively to one end of the eighth transistor T8. The fourth transistor T4 generates the second mirror current Iy. The second mirror current Iy is inputted to the source of seventh transistor T7. The output voltage Vout is connected to the source of the sixth transistor T6.

The seventh transistor T7 is controlled by the logic signal DNB of the Second Current Steering Switch S2. The sixth transistor T6 is controlled by the logic signal DN. The logic signal DNB and the logic signal DN are used for selecting the flowing direction of the input current of the Second Current Steering Switch S2. The logic signal DNB and the logic signal DN are set reversely.

The First Current Steering Switch S1 and the Second Current Steering Switch S2 further comprises an operational amplifier AMP1 and an operational amplifier AMP2 respectively.

The output end of the operational amplifier AMP1 of the First Current Steering Switch S1 is connected to the ninth transistor T9 which is the Mirror current Generator 1, and to the logic signal UP of the First Current Steering Switch S1. The negative input end of the operational amplifier AMP1 is connected to the drain electrode of the first transistor T1.

The output end of the operational amplifier AMP2 of the Second Current Steering Switch S2 is connected to the fourth transistor T4 which is the Mirror Mirror current Generator 1, and to the logic signal DNB of the Second Current Steering Switch S2. The negative input end of the operational amplifier AMP2 is connected to the drain electrode of the seventh transistor T7.

The output voltage Vout is provided on the connected node of the positive input ends of the operational amplifiers of the First Current Steering Switch S1 and the Second Current Steering Switch S2.

The size of the third transistor T3 equals to the fourth transistor T4 which is Mirror Mirror current Generator 1. The size of the eighth transistor T8 also equals to the ninth transistor T9 which is Mirror Mirror current Generator 1.

In the Mirror Mirror current Generator, the fifth transistor T5, the fourth transistor T4, the first transistor T1, the second transistor T2 and the third transistor T3 coupled with the First Current Steering Switch S1 are PMOS.

The eleventh transistor T11 is NMOS. In the Mirror Mirror current Generator 1, the tenth transistor T10, the ninth transistor T9, the sixth transistor T6 which is Second Current Steering Switch S2, the seventh transistor T7 and the eighth transistor T8 coupled with the Second Current Steering Switch S2 are NMOS.

As shown in FIG. 2, the Reference Current Source Iref provided externally is inputted to the drain electrode and the gate of the NMOS transistor T11. All the gates of NMOSs T8, T9 and T10 are connected to the gate of the transistor T11. The current passing from the drain electrode of the transistor T11 to the source thereof can be mirrored to the transistors T8, T9 and T10. The currents in the transistor T10 and in the transistor T5 are equal. The transistor T5 can mirror the current which is same as that of the transistor T10 to the transistors T3 and T4.

The transistors T1 and T2 of the First Current Steering Switch S1 and the transistors T3 and T4 of the Second Current Steering Switch S2 is used as switches in the circuit. The transistors T1 and T2 of the First Current Steering Switch S1 are controlled by the logic signal UP, UPB, whether switch on or switch off. The current direction of the First Current Steering Switch S1 is duly controlled.

Likewise, the transistors T6 and T7 of Second Current Steering Switch S2 are controlled by the external inputted logic signals DNB and DN, whether switch on or switch off. The current direction of the First Current Steering Switch S2 is duly controlled.

Meanwhile, the logic signals UP and UPB of the First Current Steering Switch S1 are set reversely. That makes it available to switch the current in the transistor T3 between the transistor T1 and T2 in the First Current Steering Switch S1. Likewise, the logic signals DNB and DN of the Second Current Steering Switch S2 are also set reversely. That also makes it available to switch the current in the transistor T8 between the transistor T6 and T7.

Further, the First Current Steering Switch S1 and the Second Current Steering Switch S2 comprises operational amplifiers AMP1 and AMP2 respectively. The operational amplifiers AMP1 and AMP2 are used to keep the voltage of IX and IY to be the same with the output voltage Vout. The current of IX passing through the transistor T3 is kept consistent with the output voltage Vout when the current is switched when passing through the transistors T1 and T2 of the First Current Steering Switch S1. The current IY of passing through the transistor T8 is kept consistent with the output voltage Vout when the current is switched when passing through the transistors T6 and T7 of the Second Current Steering Switch S2. The feed-through current from X (or Y) passing through T1 and T2 (or T6 and T7) to the output voltage Vout is avoided.

The voltage jump of the output voltage Vout is suppressed, and the stability of circuit is guaranteed.

In conclusion, two current mirrors and two operational amplifiers are added into the traditional CMOS charge pump circuit. The feed-through current is suppressed when signal switches in the said circuit. It solved the problem of the big voltage jump of the output voltage when the logic signals UP or DN switches. It guaranteed the stabilities of the circuit and the output voltage.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention

What is claimed is:

1. A CMOS charge pump circuit, comprising:
   a reference current, an ground end, and an eleventh transistor set between the reference current and the ground end;
   a first current steering switch and a second current steering switch, wherein the first current steering switch is coupled with a third transistor, the second current steering switch is coupled with an eighth transistor, and an output voltage is provided on a connected node between the first current steering switch and the second current steering switch;
   a mirror current generator, wherein the mirror current generator comprises multiple transistors to form two mirror currents of the reference current, comprising a first mirror current IX and a second mirror current IY;
   the first mirror current IX is supplied to the first current steering switch;
   the second mirror current IY is supplied to the second current steering switch; and
   the mirror current generator is set between a supply voltage of the CMOS charge pump circuit and the ground end.

2. The device according to claim 1, wherein the mirror current generator compromises:
   the interconnected a tenth transistor and a fifth transistor, where a source electrode of a tenth transistor is connected to the drain electrode of the fifth transistor, a tenth transistor is used to generate the mirror current of the eleventh transistor, and it makes the current that passes through the fifth transistor the same as that which passes through the tenth transistor;
   the mirror current generator further comprises a fourth transistor used for generating the mirror current passing through the fifth transistor;
   wherein the second mirror current IY passing through the fourth transistor is supplied to the second steering switch.

3. The device according to claim 2, wherein the transistor of the mirror current generator further comprises a ninth transistor used for generating the current passing through the tenth transistor;
   the first mirror current IX passing through the ninth transistor is supplied to the first current steering switch. The current passing through the ninth transistor is the mirror current IX in the eleventh transistor.

4. The device according to claim 2, wherein the third transistor is used for generating the mirror current of the fifth transistor and is used as the input current of the second current steering switch;
the second current steering switch comprises a seventh transistor and a sixth transistor;
the seventh transistor and the sixth transistor are controlled respectively by logic signal DNB and logic signal DN;
the logic signal DNB and the logic signal DN are used for selecting the flowing direction of the input current of the second current steering switch.

5. The device according to claim 4, wherein the logic signal DNB and the logic signal DN are set reversely.

6. The device according to claim 2, wherein the eighth transistor is used for generating the mirror current of the tenth transistor and is used as the input current of the first current steering switch;
the first transistor and the second transistor which are comprised in the first current steering switch are controlled respectively by the logic signal UP and the logic signal UPB;
the logic signal UP and the logic signal UPB are used for selecting the flowing direction of the input current of the first current steering switch.

7. The device according to claim 6, wherein the logic signal UP and the logic signal UPB are set reversely.

8. The device according to claim 6, wherein the current passing through the eighth transistor is the mirror current of the tenth transistor.

9. The device according to claim 1, wherein the first current steering switch comprises a first transistor and a second transistor whose sources are interconnected;
the sources of a first transistor and a second transistor are connected to one end of the third transistor;
wherein the first mirror current IX is inputted into the drain electrode of the first transistor, and the output voltage thereof is connected to the drain electrode of the second transistor.

10. The device according to claim 1, wherein the second current steering switch comprises a sixth transistor and a seventh transistor whose drain electrodes are interconnected;
the drain electrodes of the sixth transistor and the seventh transistor connect to one end of the eighth transistor;
wherein the second mirror current IY is inputted into the source electrode of the seventh transistor, and the output voltage thereof is connected to the source electrode of the sixth transistor.

11. The device according to claim 2, wherein the first and the second current steering switches comprise operational amplifiers AMP 1 and AMP2 respectively;
wherein, the output end of the said operational amplifier AMP 1 of the first current steering switch is connected to a ninth transistor of the mirror current generator and to a logic signal UP of the first current steering switch, and the negative input end of the operational amplifier AMP 1 is connected connect to the drain electrode of the first transistor;
wherein, the output end of the operational amplifier AMP2 of the second current steering switch is connected to the fourth transistor of the mirror current generator and to a logic signal DNB of the second current steering switch, and the negative input end of the operational amplifier AMP2 is connected to the drain electrode of a seventh transistor;
wherein, an output voltage is provided on the connected node of the positive input ends of the operational amplifiers of the first current steering switch and of the second current steering switch;
wherein, the operational amplifiers are used to suppress the feed-through current generated by the first mirror current IX passing through the first transistor and the second transistor of the first current steering switch, or by the second mirror current IY passing through a sixth transistor and the seventh transistor of the second current steering switch to ensure that the output voltage is in accordance with the first mirror current IX or the second mirror current IY.

12. The device according to claim 2, wherein the size of the third transistor equals to the fourth transistor of the mirror current generator.

13. The device according to claim 3, wherein the size of the eighth transistor equals to a ninth transistor of the mirror current generator.

14. The device according to claim 3, wherein the ratio between the gate length of the mirror current generator, the ninth transistor and the gate width of the mirror current generator, tenth transistor equals to the ratio between the gate length of the mirror current generator, the fourth transistor and the gate width of the mirror current generator, the fifth transistor.

15. The device according to claim 2, wherein the fifth transistor and the fourth transistor of the mirror current generator, the first transistor and a second transistor of the first current steering switches and the third transistor coupled to the first current steering switch are entirely PMOS.

16. The device according to claim 2, wherein the mirror current generators comprise, the tenth transistor and a ninth transistor being NMOS;
the second current steering switch comprising, a sixth transistor and a seventh transistor that are NMOS;
an eighth transistor coupled to the second current steering switch is NMOS.

* * * * *